United States Patent
Sanekata et al.

(10) Patent No.: US 10,822,579 B2
(45) Date of Patent: Nov. 3, 2020

(54) DRINK AND METHOD FOR IMPROVING AROMA OF DRINK

(71) Applicant: Sapporo Holdings Limited, Tokyo (JP)

(72) Inventors: Ayako Sanekata, Tokyo (JP); Kiyoshi Takoi, Tokyo (JP); Atsushi Tanigawa, Tokyo (JP)

(73) Assignee: Sapporo Breweries Limited, Tokyo (JP)

( * ) Notice: Subject to any disclaimer, the term of this patent is extended or adjusted under 35 U.S.C. 154(b) by 46 days.

(21) Appl. No.: 15/999,624

(22) PCT Filed: Feb. 1, 2017

(86) PCT No.: PCT/JP2017/003620
§ 371 (c)(1),
(2) Date: Aug. 20, 2018

(87) PCT Pub. No.: WO2017/141708
PCT Pub. Date: Aug. 24, 2017

(65) Prior Publication Data
US 2019/0338224 A1  Nov. 7, 2019

(30) Foreign Application Priority Data
Feb. 19, 2016 (JP) ................. 2016-029651

(51) Int. Cl.
C12C 5/02 (2006.01)
C12G 3/06 (2006.01)
A23L 2/56 (2006.01)
A23L 2/38 (2006.01)

(52) U.S. Cl.
CPC ............... *C12C 5/02* (2013.01); *A23L 2/38* (2013.01); *A23L 2/56* (2013.01); *C12G 3/06* (2013.01)

(58) Field of Classification Search
CPC ... C12C 5/02; C12C 5/026; A23L 2/38; A23L 2/56; C12G 3/06
See application file for complete search history.

(56) References Cited

U.S. PATENT DOCUMENTS

2014/0335251 A1* 11/2014 Komitopoulou ....... A01N 37/10
                                                              426/532
2017/0107464 A1    4/2017 Kanayama et al.

FOREIGN PATENT DOCUMENTS

| CN | 102634426 | * | 8/2012 | |
| JP | 2013220091 | * | 10/2013 | |
| WO | 2011/162118 A1 | | 12/2011 | |
| WO | WO-2011162118 | * | 12/2011 | ............... C12C 7/00 |
| WO | 2016/006316 A1 | | 1/2016 | |

OTHER PUBLICATIONS

Burdock, George Fenaroli's Handbook of Flavor Ingredients 6th Edition, CRC Press 2010 pp. 732-734 and 1092-1093 (Year: 2010).*
Del Caro et al "Effect of Bottle Storage on Colour, Phenolics and Volatile Composition of Malvasia and Moscato White Wines" pp. 115-121 S. Afr. J. Enol. Vitic., vol. 33, No. 1 2012 http://www.sawislibrary.co.za/dbtextimages/74392.pdf (Year: 2012).*
International Preliminary Report on Patentability and Written Opinion issued in corresponding International Patent Application No. PCT/JP2017/003620 dated Aug. 21, 2018. pages 1-9.
International Search Report issued in corresponding International Patent Application No. PCT/JP2017/003620 dated Mar. 7, 2017. pp. 1-5.
Kawakami et al., "Aroma Composition of Oolong Tea and Black Tea by Brewed Extraction Method and Characterizing Compounds of Darjeeling Tea Aroma," Journal of Agricultural and Food Chemistry, 43: 200-207 (1995).
Sanchez-Palomo et al., "Comparision of extraction methods for volatile compounds of Muscat grape juice," Talanta, 79: 871-876 (2009).

\* cited by examiner

*Primary Examiner* — Kelly J Bekker
(74) *Attorney, Agent, or Firm* — Morgan, Lewis & Bockius LLP

(57) ABSTRACT

Provided are a beverage having an unprecedented preferred aroma, and a method of improving an aroma of a beverage. The beverage according to one embodiment of the present invention has: a geranic acid content of 40 ppb or more; and a ratio of the geranic acid content to a geraniol content of 1.8 or more and 150.0 or less. The method of improving an aroma of a beverage according to one embodiment of the present invention includes: adjusting a geranic acid content of a beverage to 40 ppb or more; and adjusting a ratio of the geranic acid content to a geraniol content of the beverage to 1.8 or more and 150.0 or less.

18 Claims, 4 Drawing Sheets

FIG.1

| | | EXAMPLE 1-1 | EXAMPLE 1-2 | EXAMPLE 1-3 | EXAMPLE 1-4 | EXAMPLE 1-5 | EXAMPLE 1-6 |
|---|---|---|---|---|---|---|---|
| ADDITION AMOUNT | GERANIC ACID(ppb) | 0 | 25 | 50 | 100 | 300 | 1000 |
| | GERANIOL(ppb) | 0.0 | 2.5 | 5.0 | 10.0 | 30.0 | 100.0 |
| CONTENT | GERANIC ACID(ppb) | 0 | 25 | 50 | 100 | 300 | 1000 |
| | GERANIOL(ppb) | 3.3 | 5.8 | 8.3 | 13.3 | 33.3 | 103.3 |
| | GERANIC ACID/GERANIOL RATIO | 0.0 | 4.3 | 6.0 | 7.5 | 9.0 | 9.7 |
| SENSORY EVALUATION | AROMA OF FOREST BATHING | 1.0 | 1.5 | 2.3 | 3.0 | 4.2 | 4.5 |

FIG.2

| | | EXAMPLE 2-1 | EXAMPLE 2-2 | EXAMPLE 2-3 | EXAMPLE 2-4 | EXAMPLE 2-5 | EXAMPLE 2-6 |
|---|---|---|---|---|---|---|---|
| ADDITION AMOUNT | GERANIC ACID(ppb) | 0 | 30 | 60 | 120 | 300 | 900 |
| | GERANIOL(ppb) | 30.0 | 30.0 | 30.0 | 30.0 | 30.0 | 30.0 |
| CONTENT | GERANIC ACID(ppb) | 0 | 30 | 60 | 120 | 300 | 900 |
| | GERANIOL(ppb) | 33.3 | 33.3 | 33.3 | 33.3 | 33.3 | 33.3 |
| | GERANIC ACID/GERANIOL RATIO | 0.0 | 0.9 | 1.8 | 3.6 | 9.0 | 27.0 |
| SENSORY EVALUATION | AROMA OF FOREST BATHING | 1.0 | 1.5 | 2.3 | 3.2 | 4.2 | 4.3 |

FIG.3

|  |  | EXAMPLE 3-1C | EXAMPLE 3-1 | EXAMPLE 3-2C | EXAMPLE 3-2 | EXAMPLE 3-3C | EXAMPLE 3-3 |
|---|---|---|---|---|---|---|---|
| ADDITION AMOUNT | GERANIC ACID(ppb) | 0 | 300 | 0 | 300 | 0 | 300 |
|  | GERANIOL(ppb) | 0.0 | 0.0 | 0.0 | 0.0 | 0.0 | 0.0 |
| CONTENT | GERANIC ACID(ppb) | 0 | 300 | 0 | 300 | 0 | 300 |
|  | GERANIOL(ppb) | 3.3 | 3.3 | 2.0 | 2.0 | 24.0 | 24.0 |
|  | LINALOOL(ppb) | 2.1 | 2.1 | 26.0 | 26.0 | 55.0 | 55.0 |
|  | GERANIC ACID/GERANIOL RATIO | 0.0 | 90.9 | 0.0 | 150.0 | 0.0 | 12.5 |
| SENSORY EVALUATION | AROMA OF FOREST BATHING | 1.0 | 2.0 | 2.2 | 3.4 | 2.4 | 4.2 |

FIG.4

| | | EXAMPLE 4-1 | EXAMPLE 4-2 | EXAMPLE 4-3 | EXAMPLE 4-4 | EXAMPLE 4-5 |
|---|---|---|---|---|---|---|
| ADDITION AMOUNT | GERANIC ACID(ppb) | 300 | 300 | 300 | 300 | 300 |
| | GERANIOL(ppb) | 30.0 | 30.0 | 30.0 | 30.0 | 30.0 |
| | ACETALDEHYDE(ppm) | 0.0 | 0.4 | 2.4 | 9.4 | 19.4 |
| CONTENT | GERANIC ACID(ppb) | 300 | 300 | 300 | 300 | 300 |
| | GERANIOL(ppb) | 33.3 | 33.3 | 33.3 | 33.3 | 33.3 |
| | ACETALDEHYDE(ppm) | 0.6 | 1.0 | 3.0 | 10.0 | 20.0 |
| | GERANIC ACID/GERANIOL RATIO | 9.0 | 9.0 | 9.0 | 9.0 | 9.0 |
| SENSORY EVALUATION | AROMA OF FOREST BATHING | 5.0 | 4.6 | 3.4 | 2.4 | 2.2 |

DRINK AND METHOD FOR IMPROVING AROMA OF DRINK

TECHNICAL FIELD

The present invention relates to a beverage and a method of improving an aroma of a beverage, and more particularly, to an improvement in an aroma of a beverage containing geranic acid and geraniol.

BACKGROUND ART

In Patent Literature 1, there is a description that, in order to effectively suppress a grain odor at room temperature, a malt beverage having a content of geranic acid of from 50 ppb to 500 ppb is produced in a method of producing a malt beverage using malt as a raw material, including a mashing step including preparing mash with malt, subjecting the mash to saccharification treatment to prepare wort, and then boiling the wort, and a step of adding lemongrass to the wort immediately before completion of the boiling or after completion of the boiling, or the wort that has been further treated after completion of the boiling.

CITATION LIST

Patent Literature

[Patent Literature 1] WO 2011/162118 A1

SUMMARY OF INVENTION

Technical Problem

Meanwhile, it has not been easy to impart an unprecedented preferred aroma to a beverage, such as beer. The method described in Patent Literature 1 merely suppresses the unpreferred grain odor of a malt beverage through use of a specific herb, namely lemongrass.

The present invention has been made in view of the above-mentioned problem, and one of the objects of the present invention is to provide a beverage having an unprecedented preferred aroma, and a method of improving an aroma of a beverage.

Solution to Problem

In order to solve the above-mentioned problem, a beverage according to one embodiment of the present invention includes: a geranic acid content of 40 ppb or more; and a ratio of the geranic acid content to a geraniol content of 1.8 or more and 150.0 or less. According to the one embodiment of the present invention, the beverage having an unprecedented preferred aroma is provided.

In the beverage, the geraniol content may be 1.0 ppb or more. The beverage may have a linalool content of 2.0 ppb or more. The beverage may have an acetaldehyde content of 20.0 ppm or less. The beverage may be a sparkling beverage. In this case, the beverage may be a beer-taste beverage.

In order to solve the above-mentioned problem, a method of improving a flavor of a beverage according to one embodiment of the present invention is a method of improving an aroma of a beverage, including: adjusting a geranic acid content of a beverage to 40 ppb or more; and adjusting a ratio of the geranic acid content to a geraniol content of the beverage to 1.8 or more and 150.0 or less. According to the one embodiment of the present invention, the method of improving an aroma of a beverage is provided.

Advantageous Effects of Invention

According to the present invention, a beverage having an unprecedented preferred aroma, and a method of improving an aroma of a beverage, are provided.

BRIEF DESCRIPTION OF DRAWINGS

FIG. 1 is an explanatory diagram for showing the results of sensory evaluation of beverages in Example 1 according to one embodiment of the present invention.

FIG. 2 is an explanatory diagram for showing the results of sensory evaluation of beverages in Example 2 according to one embodiment of the present invention.

FIG. 3 is an explanatory diagram for showing the results of sensory evaluation of beverages in Example 3 according to one embodiment of the present invention.

FIG. 4 is an explanatory diagram for showing the results of sensory evaluation of beverages in Example 4 according to one embodiment of the present invention.

DESCRIPTION OF EMBODIMENTS

Now, embodiments of the present invention are described. The present invention is not limited to these embodiments.

A beverage according to one embodiment of the present invention (hereinafter referred to as "beverage of the present invention") is a beverage having a geranic acid content of 40 ppb or more, and having a ratio of the geranic acid content to a geraniol content (hereinafter referred to as "geranic acid/geraniol ratio") of 1.8 or more and 150.0 or less.

That is, the inventors of the present invention have carried out extensive investigations on technical means for imparting an unprecedented preferred aroma to a beverage, and as a result, have independently found that a beverage having an unprecedented preferred aroma is achieved by adjusting the geranic acid content and the geranic acid/geraniol ratio within respective specific ranges. Thus, the inventors have completed the present invention.

Geranic acid has cis and trans geometric isomers. In this regard, in this embodiment, the geranic acid content of the beverage of the present invention is the total of the content of cis-geranic acid (cis-3,7-dimethyl-2,6-octadienoic acid) and the content of trans-geranic acid (trans-3,7-dimethyl-2,6-octadienoic acid).

The geranic acid content of the beverage of the present invention is not particularly limited as long as the geranic acid content is 40 ppb or more. The geranic acid content is, for example, preferably 50 ppb or more, more preferably 70 ppb or more, still more preferably 90 ppb or more, particularly preferably 100 ppb or more.

The upper limit value of the geranic acid content is not particularly limited. For example, the geranic acid content may be 40 ppb or more and 1,000 ppb or less, and is preferably 50 ppb or more and 1,000 ppb or less, more preferably 70 ppb or more and 1,000 ppb or less, still more preferably 90 ppb or more and 1,000 ppb or less, particularly preferably 100 ppb or more and 1,000 ppb or less.

In addition, the geranic acid content is preferably 800 ppb or less. That is, in this case, the geranic acid content may be 40 ppb or more and 800 ppb or less, and is preferably 50 ppb or more and 800 ppb or less, more preferably 70 ppb or more and 800 ppb or less, still more preferably 90 ppb or more and 800 ppb or less, particularly preferably 100 ppb or more and 800 ppb or less.

The geranic acid/geraniol ratio of the beverage is calculated by dividing the geranic acid content of the beverage by its geraniol content. The geranic acid/geraniol ratio is not particularly limited as long as the geranic acid/geraniol ratio falls within the range of from 1.8 or more to 150.0 or less. The geranic acid/geraniol ratio is, for example, preferably 3.0 or more and 150.0 or less, more preferably 3.6 or more and 150.0 or less, still more preferably 5.0 or more and 150.0 or less, particularly preferably 7.0 or more and 150.0 or less. As the lower limit value of the above-mentioned range of the geranic acid/geraniol ratio increases, the beverage of the present invention more remarkably has the unprecedented preferred aroma.

Specifically, for example, it is preferred that the geranic acid content be 90 ppb or more (for example, 90 ppb or more and 1,000 ppb or less, or 90 ppb or more and 800 ppb or less), and the geranic acid/geraniol ratio be 3.0 or more and 150.0 or less, and it is particularly preferred that the geranic acid content be 100 ppb or more (for example, 100 ppb or more and 1,000 ppb or less, or 100 ppb or more and 800 ppb or less), and the geranic acid/geraniol ratio be 3.6 or more and 150.0 or less.

The geraniol content of the beverage of the present invention is not particularly limited as long as the geraniol content falls within a range determined by the above-mentioned geranic acid content and geranic acid/geraniol ratio. The geraniol content may be, for example, 1.0 ppb or more, or 2.0 ppb or more. When the geraniol content falls within the above-mentioned range, the beverage of the present invention more remarkably has the unprecedented preferred aroma.

Specifically, for example, it is preferred that the geranic acid content be 90 ppb or more (for example, 90 ppb or more and 1,000 ppb or less, or 90 ppb or more and 800 ppb or less), the geranic acid/geraniol ratio be 3.0 or more and 150.0 or less, and the geraniol content be 2.0 ppb or more, and it is particularly preferred that the geranic acid content be 100 ppb or more (for example, 100 ppb or more and 1,000 ppb or less, or 100 ppb or more and 800 ppb or less), the geranic acid/geraniol ratio be 3.6 or more and 150.0 or less, and the geraniol content be 2.0 ppb or more.

The beverage of the present invention preferably further contains linalool. In this case, the linalool content of the beverage of the present invention may be, for example, 2.0 ppb or more. Further, the linalool content of the beverage of the present invention is preferably 5.0 ppb or more, more preferably 10.0 ppb or more, still more preferably 20.0 ppb or more, even still more preferably 26.0 ppb or more, particularly preferably 50.0 ppb or more. As the linalool content increases, the effect achieved by adjusting the geranic acid content and the geranic acid/geraniol ratio within the respective predetermined ranges is enhanced.

Specifically, for example, it is preferred that the geranic acid content be 90 ppb or more (for example, 90 ppb or more and 1,000 ppb or less, or 90 ppb or more and 800 ppb or less), the geranic acid/geraniol ratio be 3.0 or more and 150.0 or less, the geraniol content be 2.0 ppb or more, and the linalool content be 20.0 ppb or more, and it is particularly preferred that the geranic acid content be 100 ppb or more (for example, 100 ppb or more and 1,000 ppb or less, or 100 ppb or more and 800 ppb or less), the geranic acid/geraniol ratio be 3.6 or more and 150.0 or less, the geraniol content be 2.0 ppb or more, and the linalool content be 26.0 ppb or more.

The upper limit value of the linalool content is not particularly limited, and the linalool content may be, for example, 3,000.0 ppb or less, 1,500.0 ppb or less, 1,000.0 ppb or less, 500.0 ppb or less, or 200.0 ppb or less. Each of those upper limit values of the linalool content may be combined with any one of the above-mentioned lower limit values.

The beverage of the present invention may be a beverage having a relatively small content of acetaldehyde, which is associated with an unpreferred aroma. That is, the acetaldehyde content of the beverage of the present invention may be, for example, 20.0 ppm or less.

Further, the acetaldehyde content of the beverage of the present invention is, for example, preferably 15.0 ppm or less, more preferably 10.0 ppm or less, still more preferably 8.0 ppm or less, even still more preferably 5.0 ppm or less, particularly preferably 3.0 ppm or less. As the acetaldehyde content reduces, the effect achieved by adjusting the geranic acid content and the geranic acid/geraniol ratio within the respective predetermined ranges is enhanced.

Specifically, for example, it is preferred that the geranic acid content be 90 ppb or more (for example, 90 ppb or more and 1,000 ppb or less, or 90 ppb or more and 800 ppb or less), the geranic acid/geraniol ratio be 3.0 or more and 150.0 or less, the geraniol content be 2.0 ppb or more, the linalool content be 20.0 ppb or more, and the acetaldehyde content be 5.0 ppm or less, and it is particularly preferred that the geranic acid content be 100 ppb or more (for example, 100 ppb or more and 1,000 ppb or less, or 100 ppb or more and 800 ppb or less), the geranic acid/geraniol ratio be 3.6 or more and 150.0 or less, the geraniol content be 2.0 ppb or more, the linalool content be 26.0 ppb or more, and the acetaldehyde content be 3.0 ppm or less.

The beverage of the present invention is a beverage containing geranic acid and geraniol. The beverage of the present invention is preferably a sparkling beverage. In this embodiment, the sparkling beverage is a beverage having foam properties including a foam-forming property and a foam-stability. That is, it is preferred that the sparkling beverage be, for example, a beverage containing a carbon dioxide gas and having: a foam-forming property for forming a foam layer on the top of a liquid surface when poured into a container, such as a glass; and a foam-stability for holding the formed foam for a certain period of time or longer.

The beverage of the present invention may be a sparkling beverage having a carbon dioxide gas pressure equal to or higher than a predetermined value. Specifically, the carbon dioxide gas pressure of the beverage of the present invention may be, for example, 1.0 kg/cm$^2$ or more, or 2.0 kg/cm$^2$ or more. The upper limit value of the carbon dioxide gas pressure of the beverage of the present invention is not particularly limited, and the carbon dioxide gas pressure may be, for example, 3.0 kg/cm$^2$ or less.

The beverage of the present invention is, for example, a sparkling beverage having a NIBEM value of 50 or more. The NIBEM value is used as an indicator of the foam-stability of a sparkling alcoholic beverage, such as beer. The NIBEM value is evaluated as a period of time (seconds) required for reducing the height of foam, which is formed when the sparkling beverage is poured into a predetermined container, by a predetermined amount. Specifically, the NIBEM value of the sparkling beverage is measured in accordance with a method described in the literature: "Methods of Analysis of BCOJ (Enlarged and Revised Edition) (2013) (edited by Brewery Convention of Japan (Analysis Committee), Brewers Association of Japan, publishing office: The Brewing Society of Japan)," "8.29 Foam-Foam-stability Measurement Method using NIBEM-T-."

When the beverage of the present invention is a sparkling beverage, the beverage of the present invention may be a beer-taste beverage. In this embodiment, the beer-taste beverage is a sparkling beverage having a beer-like flavor. That is, the beer-taste beverage may be, for example, beer, low-malt beer, or a sparkling beverage containing low-malt beer and an alcohol component, such as spirits. However, as described later, the beer-taste beverage is not particularly limited as long as the beer-taste beverage is a sparkling beverage having a beer-like flavor irrespective of its alcohol content, whether or not malt is used, and the presence or absence of alcoholic fermentation.

The beverage of the present invention may be a sparkling alcoholic beverage. In this embodiment, the sparkling alcoholic beverage is a sparkling beverage having an alcohol content of 1 vol % or more (alcohol percentage of 1% or more). The alcohol content of the sparkling alcoholic beverage is not particularly limited as long as the alcohol content is 1 vol % or more. The alcohol content may be, for example, from 1 vol % to 20 vol %. The sparkling alcoholic beverage may be a beer-taste beverage.

The beverage of the present invention may be a sparkling non-alcoholic beverage. In this embodiment, the non-alcoholic beverage is a beverage having an alcohol content of less than 1 vol %. The alcohol content of the non-alcoholic beverage is not particularly limited as long as the alcohol content is less than 1 vol %. The alcohol content may be, for example, less than 0.5 vol %, less than 0.05 vol %, or less than 0.005 vol %. The sparkling non-alcoholic beverage may be a beer-taste beverage.

The beverage of the present invention may be a sparkling fermented beverage. The sparkling fermented beverage is a sparkling beverage produced through alcoholic fermentation. The sparkling fermented beverage may be a beer-taste beverage.

The beverage of the present invention may be a sparkling non-fermented beverage. The sparkling non-fermented beverage is a sparkling beverage produced without alcoholic fermentation. The sparkling non-fermented beverage may be a beer-taste beverage.

The beverage of the present invention may be a sparkling malt beverage. The sparkling malt beverage is a sparkling beverage produced using a raw material containing malt. The sparkling malt beverage contains a malt-derived component. The malt may be one or more selected from a group consisting of barley malt, wheat malt, oat malt, and rye malt, and is preferably one or more selected from a group consisting of barley malt and wheat malt. A malt extract may be used as the malt. The sparkling malt beverage may be a beer-taste beverage.

The beverage of the present invention may be a sparkling non-malt beverage. The sparkling non-malt beverage is a sparkling beverage produced without use of malt. The sparkling non-malt beverage may be a beer-taste beverage.

The beverage of the present invention may be a sparkling malt fermented beverage. The sparkling malt fermented beverage is a sparkling beverage produced using a raw material containing malt through alcoholic fermentation. The sparkling malt fermented beverage may be a beer-taste beverage.

The beverage of the present invention may be a sparkling fermented alcoholic beverage. The sparkling fermented alcoholic beverage is a sparkling alcoholic beverage produced through alcoholic fermentation. The sparkling fermented alcoholic beverage may be a beer-taste beverage.

The beverage of the present invention may be a sparkling malt alcoholic beverage. The sparkling malt alcoholic beverage is a sparkling alcoholic beverage produced using a raw material containing malt. The sparkling malt alcoholic beverage may be a beer-taste beverage.

The beverage of the present invention may be a sparkling malt fermented alcoholic beverage. The sparkling malt fermented alcoholic beverage is a sparkling alcoholic beverage produced using a raw material containing malt through alcoholic fermentation. The sparkling malt fermented alcoholic beverage may be a beer-taste beverage.

The beverage of the present invention may be a sparkling non-fermented, non-alcoholic beverage. The sparkling non-fermented, non-alcoholic beverage is a sparkling non-alcoholic beverage produced without alcoholic fermentation. The sparkling non-fermented, non-alcoholic beverage may be a beer-taste beverage.

In addition, the beverage of the present invention may be a sparkling malt non-alcoholic beverage. The sparkling malt non-alcoholic beverage is a sparkling non-alcoholic beverage produced using a raw material containing malt. The sparkling malt non-alcoholic beverage may be a beer-taste beverage.

The beverage of the present invention may be a sparkling malt non-fermented, non-alcoholic beverage. The sparkling malt non-fermented, non-alcoholic beverage is a sparkling non-alcoholic beverage produced using a raw material containing malt without alcoholic fermentation. The sparkling malt non-fermented, non-alcoholic beverage may be a beer-taste beverage.

The beverage of the present invention may be a sparkling non-malt, non-fermented, non-alcoholic beverage. The sparkling non-malt, non-fermented, non-alcoholic beverage is a sparkling non-alcoholic beverage produced without use of malt and without alcoholic fermentation. The sparkling non-malt, non-fermented, non-alcoholic beverage may be a beer-taste beverage.

A method of producing the beverage of the present invention is not particularly limited as long as the method produces a beverage having the above-mentioned properties. The geranic acid content and geranic acid/geraniol ratio of the beverage of the present invention are adjusted by a raw material to be used. That is, for example, the geranic acid content and geranic acid/geraniol ratio of the beverage of the present invention may be adjusted within the above-mentioned respective ranges by using, as part of the raw material, a geranic acid-containing additive (for example, a geranic acid-containing flavoring agent) and a geraniol-containing additive (for example, a geraniol-containing flavoring agent).

In addition, in a method of producing a beverage involving using hops as part of the raw material, the geranic acid content and geranic acid/geraniol ratio of the beverage of the present invention may be adjusted within the above-mentioned respective ranges by selection and combination of varieties of the hops, and conditions of using hops, such as a use amount of the hops. In addition to the hops, the above-mentioned geranic acid-containing additive and/or geraniol-containing additive may be used. The beverage of the present invention produced using hops contains a hop-derived component. In this case, the hop-derived component may be, for example, a hop-derived bitterness component (for example, an iso-α-acid).

When the beverage of the present invention is a sparkling beverage, a method of imparting foam properties to the beverage of the present invention is not particularly limited. For example, one or more selected from a group consisting of alcoholic fermentation, use of carbonated water, and use of carbon dioxide gas may be used.

The beverage of the present invention may be produced, for example, through alcoholic fermentation by adding yeast to a raw material liquid containing a carbon source and a nitrogen source, each of which can be utilized by yeast. In this case, the beverage of the present invention may be produced through alcoholic fermentation by adding yeast to a raw material liquid prepared using a raw material containing malt.

The beverage of the present invention may be produced, for example, using a raw material containing one or more selected from a group consisting of saccharides, dietary fiber, acidulants, dyes, flavoring agents, sweeteners, and bittering agents without alcoholic fermentation. In this case, the beverage of the present invention may be produced by mixing a raw material liquid prepared using a raw material containing malt with one or more selected from a group consisting of saccharides, dietary fiber, acidulants, dyes, flavoring agents, sweeteners, and bittering agents without alcoholic fermentation.

The beverage of the present invention has an unprecedented preferred aroma because its geranic acid content and geranic acid/geraniol ratio fall within the above-mentioned respective ranges. Therefore, this embodiment encompasses a method of improving an aroma of a beverage, including: adjusting a geranic acid content within the above-mentioned range of, for example, 40 ppb or more; and adjusting a geranic acid/geraniol ratio within the above-mentioned range of, for example, from 1.8 or more to 150.0 or less.

The beverage of the present invention effectively has, for example, an aroma to be evaluated as an "aroma of forest bathing" in sensory evaluation. The "aroma of forest bathing" is an aroma that reminds a panelist of forest bathing in the sensory evaluation. In addition, the beverage of the present invention may further have, for example, an aroma to be evaluated as an "aroma of a coniferous forest" and/or an aroma to be evaluated as an "aroma of a fragrant tree." The "aroma of a coniferous forest" is an aroma that reminds a panelist of a coniferous forest of pines or the like in the sensory evaluation. The "aroma of a fragrant tree" is an aroma that reminds a panelist of a fragrant tree, such as cedar wood or patchouli, in the sensory evaluation.

In Patent Literature 1 described above, the use of lemongrass is essential. In this regard, the beverage of the present invention may be produced without use of lemongrass. In this case, the beverage of the present invention does not contain a lemongrass-derived component.

In addition, the beverage of the present invention may be produced using hops without use of an herb other than the hops. In this case, the beverage of the present invention does not contain a component derived from the herb other than the hops. Specifically, the beverage of the present invention may, for example, contain a hop-derived component and not contain the component derived from the herb other than the hops.

Next, specific Examples according to the embodiments of the present invention are described.

EXAMPLE 1

Six kinds of sparkling beverages, different from each other in geranic acid content, geraniol content, and geranic acid/geraniol ratio, were produced by adding linalool in an addition amount of 50.0 ppb to commercially available beer, and further adding different amounts of geranic acid and geraniol thereto. Linalool, geranic acid, and geraniol were added by adding linalool (manufactured by Tokyo Chemical Industry Co., Ltd.), geranic acid (manufactured by Sigma-Aldrich Co. LLC.), and geraniol (manufactured by Sigma-Aldrich Co. LLC.) that were commercially available as reagents, respectively. The beer is a sparkling malt fermented alcoholic beverage containing a hop-derived component.

After that, the sparkling beverages were each subjected to sensory evaluation by six experienced panelists. In the sensory evaluation, the "aroma of forest bathing" of each of the sparkling beverages was evaluated. Specifically, in the case of giving a score of "1" to the "aroma of forest bathing" of the commercially available beer to which geranic acid and geraniol had not been added (Example 1-1), the "aroma of forest bathing" of each of the five kinds of sparkling beverages obtained by adding geranic acid and geraniol (Example 1-2 to Example 1-5) was given a score on a five-grade scale of from "1" to "5". That is, as the "aroma of forest bathing" was enhanced, a higher score was given.

In FIG. 1, for each of the six kinds of sparkling beverages, the addition amounts of geranic acid and geraniol, the contents of geranic acid and geraniol, the geranic acid/geraniol ratio, and the score given in the sensory evaluation are shown. The score for the sensory evaluation shown in FIG. 1 is a value calculated by dividing the total of scores given by the panelists by the number of the panelists.

As shown in Example 1-1 of FIG. 1, the commercially available beer before the addition of geranic acid and geraniol had a geranic acid content of 0 ppb and a geraniol content of 3.3 ppb. In addition, in all the examples, the beer after the addition of linalool had a linalool content of 52.1 ppb.

The contents of geranic acid, geraniol, and linalool were measured by a Solid Phase MicroExtraction-Gas Chromatography-Mass Spectrometry (SPME-GC-MS) method. Specific analysis conditions were as described below.

[Measurement of Geranic Acid Content]

8 mL of a sample solution prepared by diluting a beverage to be analyzed with a 0.5% aqueous solution of phosphoric acid by a factor of 2 was put into a vial for SPME into which 3 g of NaCl had been put in advance. Further, benzyl acetate was added as an internal standard at 500 ppb, and the vial was hermetically sealed. A calibration curve was prepared by a standard addition method. Each vial was shaken at 40° C. for 15 minutes, and then fiber for SPME (Polydimethylsiloxane/Divinylbenzene 65 μm: manufactured by Supelco) was exposed to the headspace in the vial. Volatile components were adsorbed onto the fiber at 40° C. for 15 minutes, and then desorbed at an injection port for 3 minutes to be analyzed by GC/MS.

The analysis conditions of GC/MS were as follows. Analyzer: Agilent GC-MS 5977A. Column: DB-FFAP 30 m×0.25 mm, film thickness: 0.25 μm. Injection method: splitless injection. Constant flow: 1.0 mL/min. Carrier gas: He. Injection port temperature: 270° C. Transfer line: 250° C. Oven temperature: 40° C. (3 min)→5° C./min→250° C. (0 min). MS conditions: SIM 33.0 min cis-geranic acid m/z 123, 33.8 min trans-geranic acid m/z 123, 22.0 min benzyl acetate (ISTD) m/z 108.

[Measurement of Geraniol Content and Linalool Content]

As a sample solution, 8 mL of a beverage to be analyzed was put into a vial for SPME into which 3 g of NaCl had been put in advance. Further, benzyl acetate was added as an internal standard at 500 ppb, and the vial was hermetically sealed. A calibration curve was prepared by a standard addition method. Each vial was shaken at 40° C. for 15 minutes, and then fiber for SPME (Polydimethylsiloxane/

Divinylbenzene 65 μm: manufactured by Supelco) was exposed to the headspace in the vial. Volatile components were adsorbed onto the fiber at 40° C. for 15 minutes, and then desorbed at an injection port for 3 minutes to be analyzed by GC/MS.

The analysis conditions of GC/MS were as follows. Analyzer: Agilent GC-MS 5977A. Column: HP-1MS 30 m×0.25 mm, film thickness: 1.0 μm. Injection method: splitless injection. Constant flow: 1.1 mL/min. Carrier gas: He. Injection port temperature: 270° C. Transfer line: 320° C. Oven temperature: 40° C. (3 min)→5° C./min→200° C. (0 min)→10° C./min→320° C. (0 min). MS conditions: SIM20.7 min linalool m/z 136, 25.3 min geraniol m/z 123, 22.3 min benzyl acetate (ISTD) m/z 108.

As shown in FIG. 1, as the geranic acid content, the geraniol content, and the geranic acid/geraniol ratio increased, the score for the sensory evaluation also increased. For example, the sparkling beverages each having a geranic acid content of 50 ppb or more, a geraniol content of 8.3 ppb or more, and a geranic acid/geraniol ratio of 6.0 or more (Example 1-3 to Example 1-6) were each given a score of "2.3" or more in the sensory evaluation, and thus the sparkling beverages were each evaluated as having an "aroma of forest bathing."

Further, the sparkling beverages each having a geranic acid content of 100 ppb or more, a geraniol content of 13.3 ppb or more, and a geranic acid/geraniol ratio of 7.5 or more (Example 1-4 to Example 1-6) were each given a score of "3.0" or more in the sensory evaluation, and thus the sparkling beverages were each evaluated as having a remarkable "aroma of forest bathing."

Although evaluated as having a remarkable "aroma of forest bathing," the sparkling beverage of Example 1-6 was evaluated as having unpreferred "astringency", which none of the sparkling beverages of the other examples had. In addition, in the sensory evaluation, similar evaluations to those for the "aroma of forest bathing" were obtained for an "aroma of a coniferous forest" and an "aroma of a fragrant tree."

EXAMPLE 2

In the same manner as in Example 1 described above, six kinds of sparkling beverages different from each other in geranic acid content and geranic acid/geraniol ratio were produced by adding linalool in an addition amount of 50.0 ppb to the commercially available beer (commercially available beer that was also used in Example 1), and further adding different amounts of geranic acid and a constant amount of geraniol thereto. Then, the sparkling beverages were each subjected to sensory evaluation by six panelists in the same manner as in Example 1 described above.

In FIG. 2, for each of the six kinds of sparkling beverages, the addition amounts of geranic acid and geraniol, the contents of geranic acid and geraniol, the geranic acid/geraniol ratio, and the score given in the sensory evaluation are shown.

As shown in FIG. 2, as the geranic acid content and the geranic acid/geraniol ratio increased, the score for the sensory evaluation also increased. For example, the sparkling beverages each having a geranic acid content of 60 ppb or more and a geranic acid/geraniol ratio of 1.8 or more (Example 2-3 to Example 2-6) were each given a score of "2.3" or more in the sensory evaluation, and thus the sparkling beverages were each evaluated as having an "aroma of forest bathing."

Further, the sparkling beverages each having a geranic acid content of 120 ppb or more and a geranic acid/geraniol ratio of 3.6 or more (Example 2-4 to Example 2-6) were each given a score of "3.2" or more in the sensory evaluation, and thus the sparkling beverages were each evaluated as having a remarkable "aroma of forest bathing."

Although evaluated as having a remarkable "aroma of forest bathing," the sparkling beverage of Example 2-6 was evaluated as having unpreferred "astringency", which none of the sparkling beverages of the other examples had. In consideration also of the result of Example 1-6 in Example 1 described above, the "astringency" was considered to be due to the large geranic acid content (900 ppb or 1,000 ppb). In addition, in the sensory evaluation, similar evaluations to those for the "aroma of forest bathing" were obtained for an "aroma of a coniferous forest" and an "aroma of a fragrant tree."

EXAMPLE 3

In the same manner as in Example 1 described above except that linalool was not added, six kinds of sparkling beverages different from each other in geraniol content, linalool content, and geranic acid/geraniol ratio were produced by adding only a constant amount of geranic acid to each of three kinds of commercially available beers different from each other in geraniol content and linalool content. Then, the sparkling beverages were each subjected to sensory evaluation by five panelists in the same manner as in Example 1 described above.

In FIG. 3, for each of the six kinds of sparkling beverages, the addition amounts of geranic acid and geraniol, the contents of geranic acid, geraniol, and linalool, the geranic acid/geraniol ratio, and the score given in the sensory evaluation are shown. Example 3-1C is the result of the commercially available beer that was also used in Example 1.

As shown in FIG. 3, the sparkling beverages produced by adding geranic acid (Example 3-1, Example 3-2, and Example 3-3) each had an effectively enhanced "aroma of forest bathing" compared to the beers to which the geranic acid had not been added (Example 3-1C, Example 3-2C, and Example 3-3C).

Further, the sparkling beverage of Example 3-2 having a linalool content of 26.0 ppb, and the sparkling beverage of Example 3-3 having a linalool content of 55.0 ppb each had a remarkable "aroma of forest bathing" compared to the sparkling beverage of Example 3-1 having a linalool content of 2.1 ppb.

That is, it was confirmed that the effect of imparting an "aroma of forest bathing" achieved by adjusting the geranic acid content and the geranic acid/geraniol ratio within respective predetermined ranges was enhanced as the linalool content of the sparkling beverage increased.

EXAMPLE 4

In the same manner as in Example 1 described above, five kinds of sparkling beverages different from each other only in acetaldehyde content were produced by adding linalool in an addition amount of 50.0 ppb to the commercially available beer (commercially available beer that was also used in Example 1), and further adding a constant amount of geranic acid, a constant amount of geraniol, and different amounts of acetaldehyde thereto. Acetaldehyde was added by adding acetaldehyde (manufactured by Sigma-Aldrich Co. LLC.) that was commercially available as a reagent. Then, the sparkling beverages were each subjected to sensory evaluation by five panelists in the same manner as in Example 1 described above.

In FIG. 4, for each of the five kinds of sparkling beverages, the addition amounts of geranic acid, geraniol, and acetaldehyde, the contents of geranic acid, geraniol, and acetaldehyde, the geranic acid/geraniol ratio, and the score given in the sensory evaluation are shown.

As shown in Example 4-1 of FIG. 4, the beer before the addition of acetaldehyde had an acetaldehyde content of 0.6 ppm. The acetaldehyde content was measured in accordance with a method described in the literature: "Methods of Analysis of BCOJ (Enlarged and Revised Edition) (2013) (edited by Brewery Convention of Japan (Analysis Committee), Brewers Association of Japan, publishing office: The Brewing Society of Japan)," "8.22 Low-boiling-point Aroma Component."

As shown in FIG. 4, the five kinds of sparkling beverages were each given a score of "2.2" or more in the sensory evaluation, and thus the sparkling beverages were each evaluated as having an "aroma of forest bathing." As the acetaldehyde content reduced, the score for the sensory evaluation increased.

In particular, the sparkling beverages each having an acetaldehyde content of less than 10 ppm (specifically, 3.0 ppm or less) (Example 4-1 to Example 4-3) were each given a score of "3.4" or more in the sensory evaluation, and thus the sparkling beverages were each evaluated as having a remarkable "aroma of forest bathing."

That is, it was confirmed that the effect of imparting an "aroma of forest bathing" achieved by adjusting the geranic acid content and the geranic acid/geraniol ratio within respective predetermined ranges was enhanced as the acetaldehyde content of the sparkling beverage decreased.

The invention claimed is:

1. A sparkling malt beverage, which has:
   a geranic acid content of 40 ppb or more and 1000 ppb or less; and
   a ratio of the geranic acid content to a geraniol content of 1.8 or more and 150.0 or less, wherein the beverage excludes lemongrass.

2. The beverage according to claim 1, wherein the geraniol content is 1.0 ppb or more and 555.55 ppb less.

3. The beverage according to claim 1, wherein the beverage has a linalool content of 2.0 ppb or more.

4. The beverage according to claim 1, wherein the beverage has an acetaldehyde content of 20.0 ppm or less.

5. A method of producing the beverage of claim 1, comprising:
   adjusting a geranic acid content of a beverage to 40 ppb or more and 1000 ppb or less; and
   adjusting a ratio of the geranic acid content to a geraniol content of the beverage to 1.8 or more and 150.0 or less.

6. A beer-taste beverage selected from beer, low-malt beer, or a sparkling beverage containing the low-malt beer, which has:
   a geranic acid content of 40 ppb or more and 1000 ppb or less; and
   a ratio of the geranic acid content to a geraniol content of 1.8 or more and 150.0 or less, wherein the beverage excludes lemongrass.

7. The beverage according to claim 6, wherein the geraniol content is 1.0 ppb or more and 555.55 ppb less.

8. The beverage according to claim 6, wherein the beverage has a linalool content of 2.0 ppb or more.

9. The beverage according to claim 6, wherein the beverage has an acetaldehyde content of 20.0 ppm or less.

10. A method of producing the beverage of claim 6, comprising:
    adjusting a geranic acid content of a beverage to 40 ppb or more and 1000 ppb or less; and
    adjusting a ratio of the geranic acid content to a geraniol content of the beverage to 1.8 or more and 150.0 or less.

11. The beverage according to claim 1, wherein the geranic acid content is 100 ppb or more and 1000 ppb or less.

12. The beverage according to claim 1, wherein the geranic acid content is 100 ppb or more and 800 ppb or less.

13. The beverage according to claim 6, wherein the geranic acid content is 100 ppb or more and 1000 ppb or less.

14. The beverage according to claim 6, wherein the geranic acid content is 100 ppb or more and 800 ppb or less.

15. The beverage according to claim 6, wherein the beer-taste beverage is alcoholic beer.

16. The beverage according to claim 6, wherein the beer-taste beverage is non-alcoholic beer.

17. The beverage according to claim 6, wherein the beer-taste beverage is the low-malt beer.

18. The beverage according to claim 6, wherein the beer-taste beverage is the sparkling beverage containing the low-malt beer.

* * * * *